(12) United States Patent
Ng et al.

(10) Patent No.: US 9,632,838 B2
(45) Date of Patent: Apr. 25, 2017

(54) CLOUD BASED MEDIA PROCESSING WORKFLOWS AND MODULE UPDATING

(71) Applicant: Microsoft Technology Licensing, LLC, Redmond, WA (US)

(72) Inventors: Samuel Ng, Bellevue, WA (US); Prashant D. Agrawal, Kirkland, WA (US); Brian James Walker, Southbury, CT (US); John Deutscher, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 13/718,155

(22) Filed: Dec. 18, 2012

(65) Prior Publication Data

US 2014/0173596 A1  Jun. 19, 2014

(51) Int. Cl.
| | |
|---|---|
| G06F 9/46 | (2006.01) |
| G06F 9/455 | (2006.01) |
| G06F 9/50 | (2006.01) |
| G06F 9/445 | (2006.01) |

(52) U.S. Cl.
CPC ........ G06F 9/5072 (2013.01); G06F 9/45558 (2013.01); *G06F 8/61* (2013.01); *G06F 8/65* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 5,794,061 A | * | 8/1998 | Hansen et al. ................. 712/1 |
| 6,006,318 A | * | 12/1999 | Hansen et al. ................ 712/28 |
| 7,080,124 B1 | | 7/2006 | Shankar |
| 7,080,386 B2 | | 7/2006 | Thrift et al. |
| 7,373,410 B2 | | 5/2008 | Monza et al. |
| 7,693,897 B2 | | 4/2010 | Bugir et al. |

(Continued)

OTHER PUBLICATIONS

Kalturian, "Understanding Kaltura—Open Source Online Video Platform", Published on: Aug. 19, 2009, Available at: kaltura.org/understanding-kaltura-open-source-online-video-platform.

(Continued)

*Primary Examiner* — Abdullah Al Kawsar
*Assistant Examiner* — Bradley Teets
(74) *Attorney, Agent, or Firm* — Workman Nydegger (57) ABSTRACT

Embodiments are directed to providing an extensible platform that allows users to select from and implement different types of media processors and to providing a management portal that allows users to manage their media processors. In one scenario, a computer system receives from a user a workflow with various tasks that are to be processed using a user-specified media processor. The computer system schedules computer system resources including a virtual machine on which the user-specified media processor is to be installed. The user-specified media processor includes a corresponding media processor installer. The computer system instantiates the scheduled virtual machine on the computer system, initiates the media processor installer to install the user-specified media processor on the instantiated virtual machine, and implements the installed media processor on the instantiated virtual machine to process the workflow tasks.

20 Claims, 4 Drawing Sheets

(56) References Cited

U.S. PATENT DOCUMENTS

| | | | |
|---|---|---|---|
| 8,300,247 B2* | 10/2012 | Shimmoto | 358/1.15 |
| 8,418,206 B2* | 4/2013 | Bryant et al. | 725/58 |
| 8,799,422 B1* | 8/2014 | Qu et al. | 709/220 |
| 8,943,489 B1* | 1/2015 | Qu | 717/168 |
| 2005/0198097 A1* | 9/2005 | Kalnitsky | 709/200 |
| 2007/0266382 A1* | 11/2007 | Webb | 717/162 |
| 2008/0303837 A1* | 12/2008 | Swift | G06F 9/5044 345/541 |
| 2009/0046069 A1* | 2/2009 | Griffin et al. | 345/173 |
| 2009/0193489 A1* | 7/2009 | White et al. | 725/134 |
| 2010/0114825 A1* | 5/2010 | Siddegowda | 707/638 |
| 2011/0055712 A1* | 3/2011 | Tung et al. | 715/738 |
| 2012/0054741 A1* | 3/2012 | Ali | H04L 9/3231 718/1 |
| 2012/0198447 A1* | 8/2012 | Osogami | G06F 9/5066 718/1 |
| 2013/0006955 A1* | 1/2013 | Jullien | G06F 9/5066 707/706 |
| 2013/0042179 A1* | 2/2013 | Cormack et al. | 715/723 |
| 2013/0047160 A1* | 2/2013 | Conover | 718/1 |
| 2013/0086202 A1* | 4/2013 | Connelly et al. | 709/217 |
| 2013/0227615 A1* | 8/2013 | Bryant et al. | 725/58 |
| 2014/0075438 A1* | 3/2014 | He | H04L 67/08 718/1 |
| 2014/0090075 A1* | 3/2014 | Verma et al. | 726/26 |

OTHER PUBLICATIONS

"Windows Azure Media Services Preview for Developers", Retrieved on: Nov. 22, 2012, Available at: windowsazure.com/en-us/develop/net/other-resources/windows-azure-media-services-preview-for-developers/.

Pai, et al., "Multimedia Conferencing Using Java Media Framework", In the proceeding of International Conference on Computing and Control Engineering (ICCCE 2012), Apr. 12, 2012, 8 pages.

"Tutorial : Getting started with the JavaTM Media Framework", Retrieved on: Nov. 22, 2012, Available at: ee.iitm.ac.in/~tgvenky/JMFBook/Tutorial.pdf.

* cited by examiner

CLOUD BASED MEDIA PROCESSING WORKFLOWS AND MODULE UPDATING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to process media. For instance, media player applications may access and play music and movies from a variety of different sources, including local data sources (e.g. hard drive or DVD) as well as streaming media. Streaming media may be provided by media servers such as those hosted on the cloud. Each media server may provide different types of media, in a variety of different formats. Some of the media formats may be proprietary, while others may use an open-source or otherwise publicly available encoding system.

BRIEF SUMMARY

Embodiments described herein are directed to providing an extensible platform that allows users to select from and implement different types of media processors and to providing a management portal that allows users to manage their media processors. In one embodiment, a computer system receives from a user a workflow with various tasks that are to be processed using a user-specified media processor. The computer system schedules computer system resources including a virtual machine on which the user-specified media processor is to be installed. The user-specified media processor includes a corresponding media processor installer. The computer system instantiates the scheduled virtual machine on the computer system, initiates the media processor installer to install the user-specified media processor on the instantiated virtual machine, and implements the installed media processor on the instantiated virtual machine to process the workflow tasks.

In another embodiment, a computer system receives an input from a user indicating that a virtual machine running a first version of a user-specified media processor is to be is to be updated to a second, different version of the user-specified media processor. The virtual machine includes an installed media processor that processes workflow tasks. The computer system transfers those workflow tasks that are pending processing by the installed user-specified media processor on the virtual machine to another, different virtual machine. The computer system also updates the user-specified media processor's installation files on the virtual machine and installs the second version of the user-specified media processor on the virtual machine using the updated installation files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to providing an extensible platform that allows users to select from and implement different types of media processors and to providing a management portal that allows users to manage their media processors. In one embodiment, a computer system receives from a user a workflow with various tasks that are to be processed using a user-specified media processor. The computer system schedules computer system resources including a virtual machine on which the user-specified media processor is to be installed. The user-specified media processor includes a corresponding media processor installer. The computer system instantiates the scheduled virtual machine on the computer system, initiates the media processor installer to install the user-specified media processor on the instantiated virtual machine, and implements the installed media processor on the instantiated virtual machine to process the workflow tasks.

In another embodiment, a computer system receives an input from a user indicating that a virtual machine running a first version of a user-specified media processor is to be is to be updated to a second, different version of the user-specified media processor. The virtual machine includes an installed media processor that processes workflow tasks. The computer system transfers those workflow tasks that are pending processing by the installed user-specified media processor on the virtual machine to another, different virtual machine. The computer system also updates the user-specified media processor's installation files on the virtual machine and installs the second version of the user-specified media processor on the virtual machine using the updated installation files.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
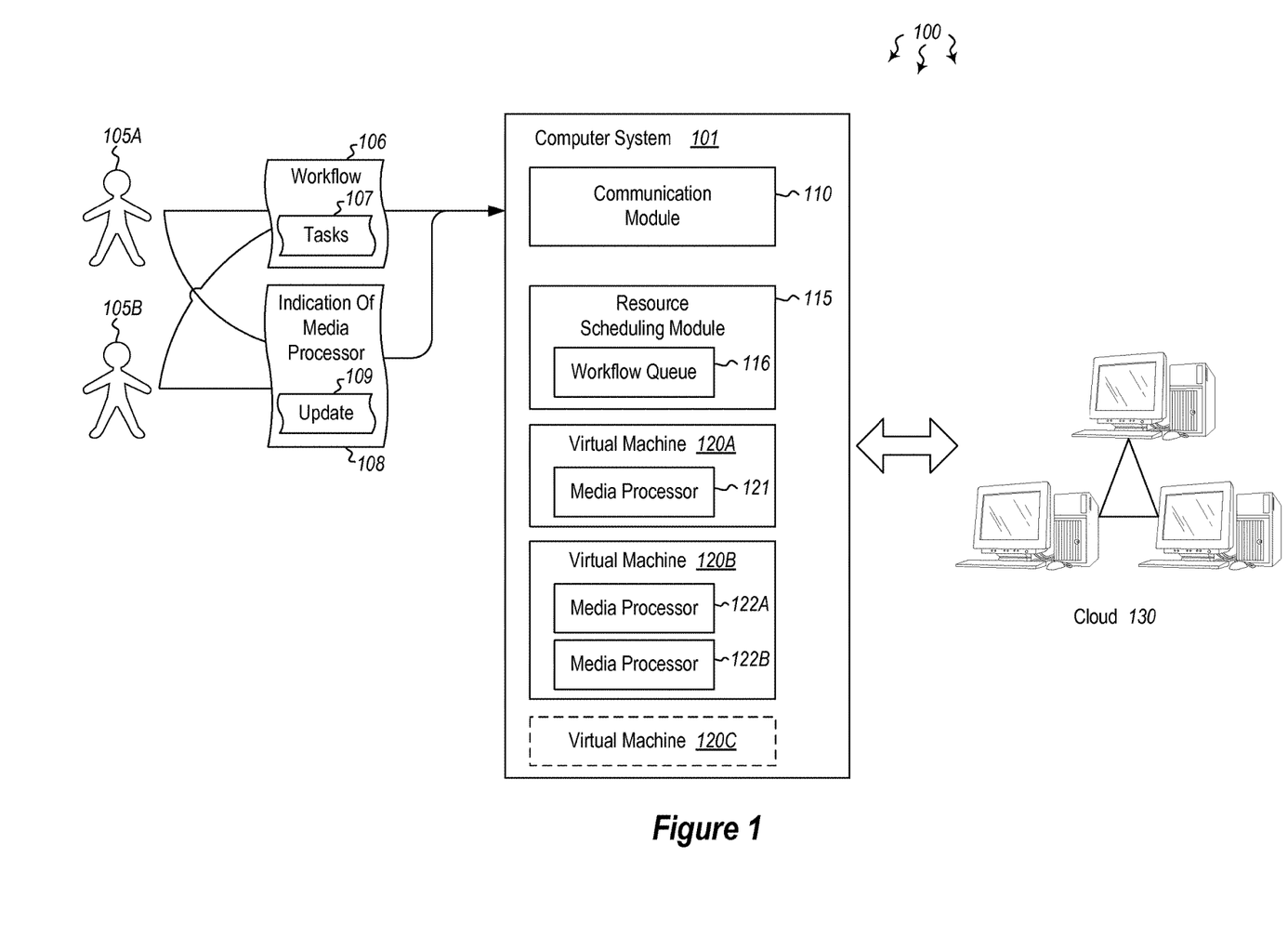
FIG. 1 illustrates a computer architecture in which embodiments described herein may operate including providing an extensible platform that allows users to select from and implement different types of media processors.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, communication module 110 may send or receive communications from users 105A and/or 105B and from computer systems within cloud 130. The computer system 101 may itself be part of cloud 130 or part of another cloud. The cloud 130 may be a public cloud or a private cloud, and may include substantially any number of computing systems. The computer system 101 may, in some embodiments, receive workflows from tenants or users 105A/105B. Each depicted user may represent a single user or a group of users such as an organization. Accordingly, the workflows 106 may be from single users or from groups of users.

The workflows may include various tasks 107 which are part of the workflow. These tasks may include a variety of different functions, including media processing-related functions. In some cases, virtual machines (e.g. 120A-C) may be instantiated and may have media processors installed thereon. These media processors may then perform the workflow tasks. It should be noted that the term "media processor", as used herein, refers to any software and/or hardware module that is configured to perform a media processing task. These media processing tasks may include, but are not limited to, video encoding, decoding or transcoding, digital watermarking, digital rights management application and enforcement, image processing (including format changes), audio encoding, decoding or transcoding and other media processing tasks.

Each media processor may be configured to perform a media-related task in a specified manner. For instance, one media processor may be configured to transcode movie files from a native resolution to lower resolutions designed for playback on tablet computers, phones or gaming devices. Another media processor may be configured to apply digital watermarking to images. Another media processor may be configured transcode audio files from a native format to a lower-bitrate format. Each of these media processors may be designed using open-source, publicly available code, or may be proprietary. Accordingly, for example, user 105A may use a publicly available transcoding technology to perform video transcoding, and may use a proprietary digital watermarking technology to perform watermarking on the transcoded video. Users may thus mix and match media processors with different media processing technologies to perform the desired steps of a workflow. Thus, if a workflow included the tasks of transcoding, watermarking and applying digital rights management, one or more media processors using public or proprietary technologies may be used to perform the workflow.

In one embodiment, various steps may be performed to process a workflow, as follows: 1) a user 105A/105B submits a workflow 106 with a task 107 that uses a specific media processor for processing (e.g. the media processor indicated in indication 108). At this point, the user may include custom options that are specific to the media processor requested. For example, if an audio encoder was chosen that provided specialized formatting, the user may select to perform this specialized formatting. 2) The resource scheduling module 115 queues the workflow tasks and analyzes the available resources to pick a resource to perform the task. Resources may include physical hardware resources such as processing cores, hard drive storage, networking ports, etc., or may include virtual resources such as virtual machines (each with their own specified allocation of physical resources).

3) The computer system 101 initiates the virtual machine (e.g. 120A), installs an operating system on it (if one is not already installed) and runs a media processor installer to install the specified media processor 121 onto the virtual machine. 4) The computer system 101 dynamically loads the user-specified media processor using an interface designed to allow interaction between the computer system and the media processor. 5) Through the interface, the computer system 101 invokes the media processor and causes it to do the actual processing of the workflow tasks 107. This processing includes any custom configuration options set by the user in the initial workflow processing request. The computer system flows this private data to the media processor component directly. 6) Through another interface (host interface 452 described in FIG. 4 below), the media processor 121 is able to call back into the computer system 101 to get access to computer system resources, such as downloading data onto the computer system, decrypting the data, creating outputs, and encrypting the outputs. 7) Once the media processor has finished processing the task, it returns the results to the computer system 101, which then either chains the result to subsequent tasks, or makes it available for the user 105A to consume.

In another embodiment, steps are performed to bring a user or partner onboard and thus give them access to the media processor/workflow system. 1) The user implements a media processor 121 (either their own proprietary processor, or another public or proprietary processor) using a media processor interface (455 in FIG. 4, described below). 2) The user builds their installer, and compiles an installation script that the computer system 101 will run on initialization of the virtual machine containing the media processor (e.g. virtual machine 120B which includes media processors 122A and 122B). 3)

The user uses a management portal to manage their media processors, including the different versions of their media processors and the different locations of the cloud datacenters in which the computer system 101 is located. 4) The user submits new, updated media processor binaries for approval. A cloud host or other entity may verify the binaries for integrity and lack of malicious code. 5) Once the binaries have been verified, the computer system 101 suspends any currently queued jobs and holds the queue for any remaining jobs not already scheduled for the media processor. Once the virtual machines are drained of pending tasks, the computer system replaces the media processor installation files and flushes the virtual machines so that the next task will cause the virtual machines to reinstall the updated binaries. These embodiments, as well as other concepts will be explained further below with regard to methods 200 and 300 of FIGS. 2 and 3, respectively.

Figure 2:
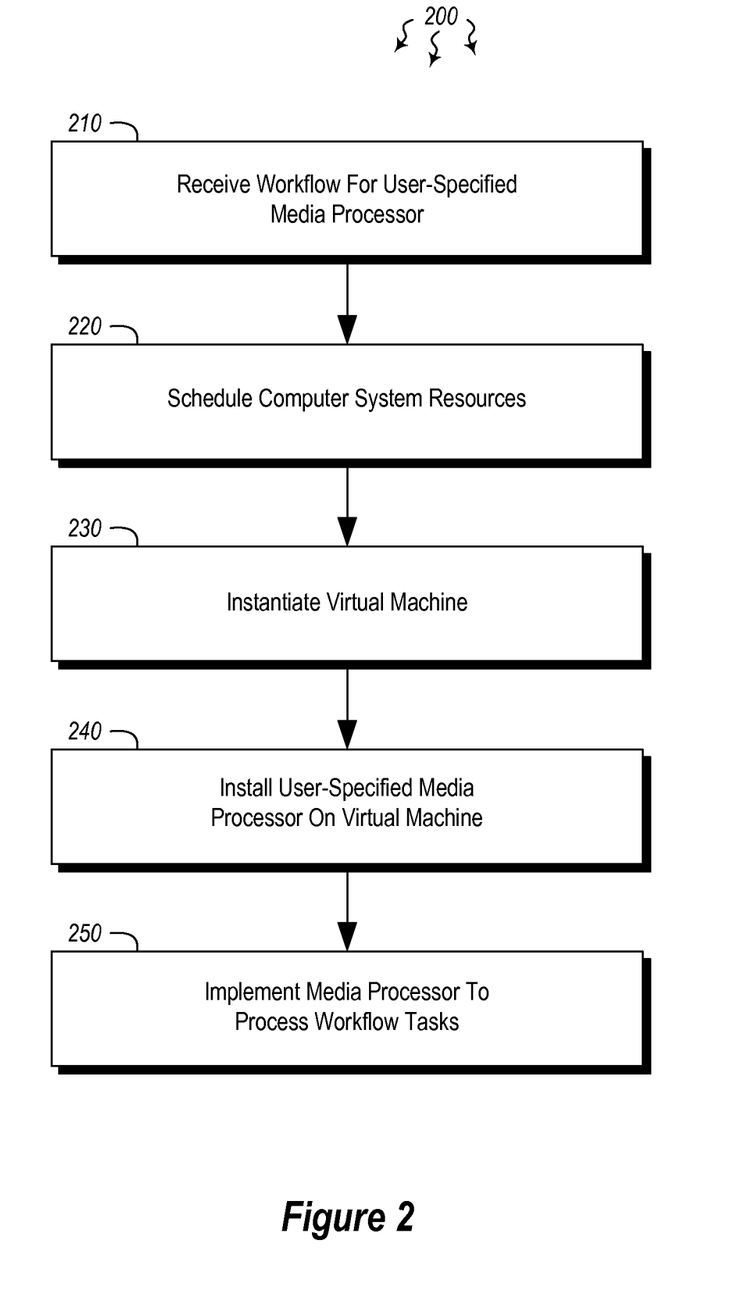
FIG. 2 illustrates a flowchart of an example method for providing an extensible platform that allows users to select from and implement different types of media processors.
Figure 3:
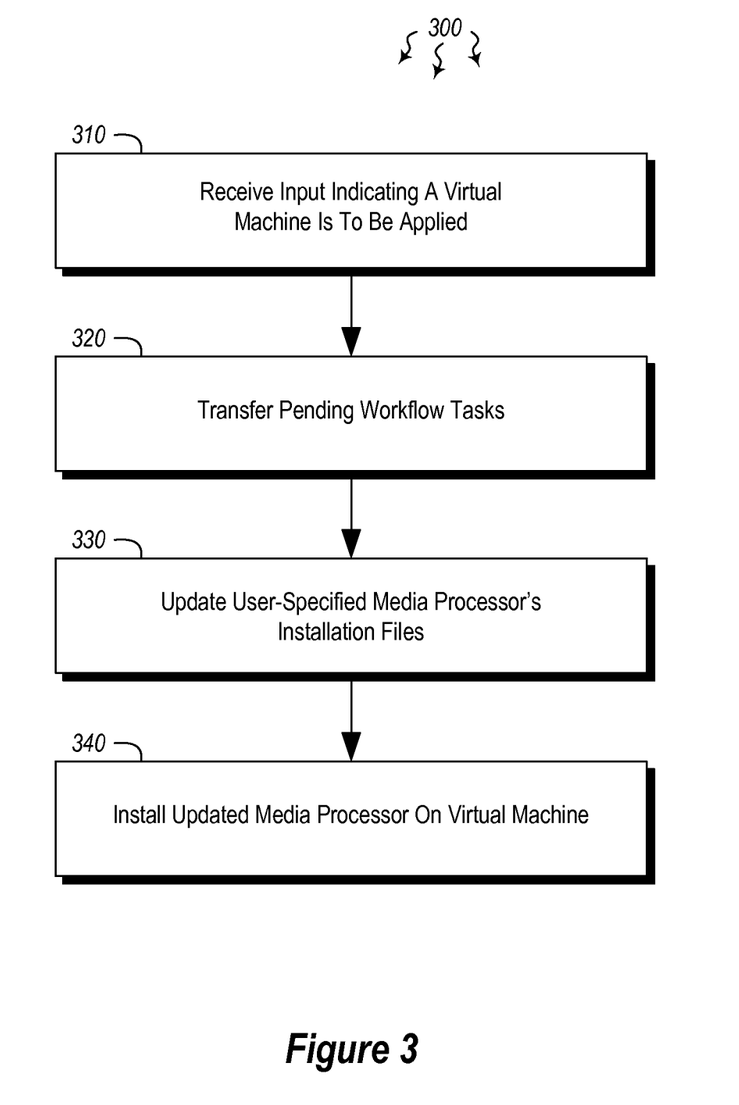
FIG. 3 illustrates a flowchart of an example method for providing a management portal that allows users to manage their media processors.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an extensible platform that allows users to select from and implement different types of media processors. The method 200 will now be described with frequent reference to the components and data of environments 100 and 400 of FIGS. 1 and 4, respectively.

Method 200 includes an act of receiving from a user a workflow with one or more tasks that implement a user-specified media processor to process the one or more tasks (act 210). For example, communication module 110 may receive from user 105A and/or 105B a workflow 106 that includes multiple different tasks 107 that are to be performed as part of the workflow. The workflow tasks may be processed by one or more user-specified media processors (e.g. 121). This media processor may perform a media processing task such as encoding, decoding, encryption, decryption, watermarking, applying digital rights management or other tasks. Typically, each media processor will perform a single task (such as encoding); however, in some cases, a media processor may be configured to process multiple different types of tasks.

The workflow 106 may be defined by the user 105A. The user may, for example, create a workflow that includes tasks that are to be performed on each piece of media provided to the computer system 101. Thus, a company that produces movies or music may send their movie and music files to the computer system 101, and have a specified workflow applied to each file. The workflow may be modified or altered for different types of media files, for certain data types, for certain batches of files or as a customized one-off batch. The user thus has full control over which workflows are applied to which files. The user also has full control of which media processors are used to process the workflow's tasks 107. The user (or organization) may provide their own specified media processor that is to be used in their workflows. The user may also use other, existing media processors to perform other tasks within their workflow. Still further, the user may tailor individual workflows with custom options that are specific to the user-specified (and/or user-provided) media processor.

Method 200 includes an act of scheduling one or more computer system resources including at least one virtual machine on which the user-specified media processor is to be installed, the user-specified media processor including a corresponding media processor installer (act 220). For example, resource scheduling module 115 may schedule hardware and/or software resources including one or more virtual machines 120A-C. The media processor(s) selected by the user may be installed on the virtual machines and then used to process the workflow 106 tasks 107. Each media processor may have its own set of installation files which, in some cases, are activated once a task has been assigned to that media processor. Some of the virtual machines 120A-C are shown as already instantiated (120A and 120B), while 120C is shown in dotted lines, indicating that it has yet to be instantiated. It should be noted that while three virtual machines are shown in FIG. 1, substantially any number of virtual machines may be used.

In some cases, scheduling the computer system resources, as performed by resource scheduling module 115, may include adding workflow tasks to a task queue 116, along with workflow tasks from other computer system users. Thus, in cases where multiple tenants are using computer system 101 (in a cloud scenario), the communication module 110 may receive workflows from multiple different tenants, and from multiple different users within each tenant. The resource scheduling module keeps each tenant's and each user's workflows separate from each other, and queues each workflow accordingly. Eventually, each workflow task is placed in a queue of user-submitted tasks (e.g. a first-in-first-out (FIFO) queue) for execution. After execution, the results are separated according to user/tenant and provided to that user or tenant.

Next, method 200 includes an act of instantiating the scheduled virtual machine on the computer system (act 230). Computer system 101 thus instantiates those virtual machines 120A-C that have been scheduled. The instantiated virtual machines are then ready to install a media processor (e.g. 121, 122A or 122B) and/or run previously-installed media processors. Upon indication by the computer system 101 or upon an indication that a specified task is to be processed, the media processor installer that is part of each media processor is initiated to install the user-specified media processor on the instantiated virtual machine (act 240). This installed media processor is then used to process the one or more workflow tasks (act 250).

In some embodiments, it may be determined that the user-specified media processor is already being provided by a previously instantiated virtual machine. In such cases, duplication of virtual machines may be avoided and the received workflow tasks may be sent to the media processor that is already running at the previously instantiated virtual machine. It should be noted that, in such cases, each user's tasks are kept separate from the other user's tasks, even if they are processed by the same media processor.

Figure 4:
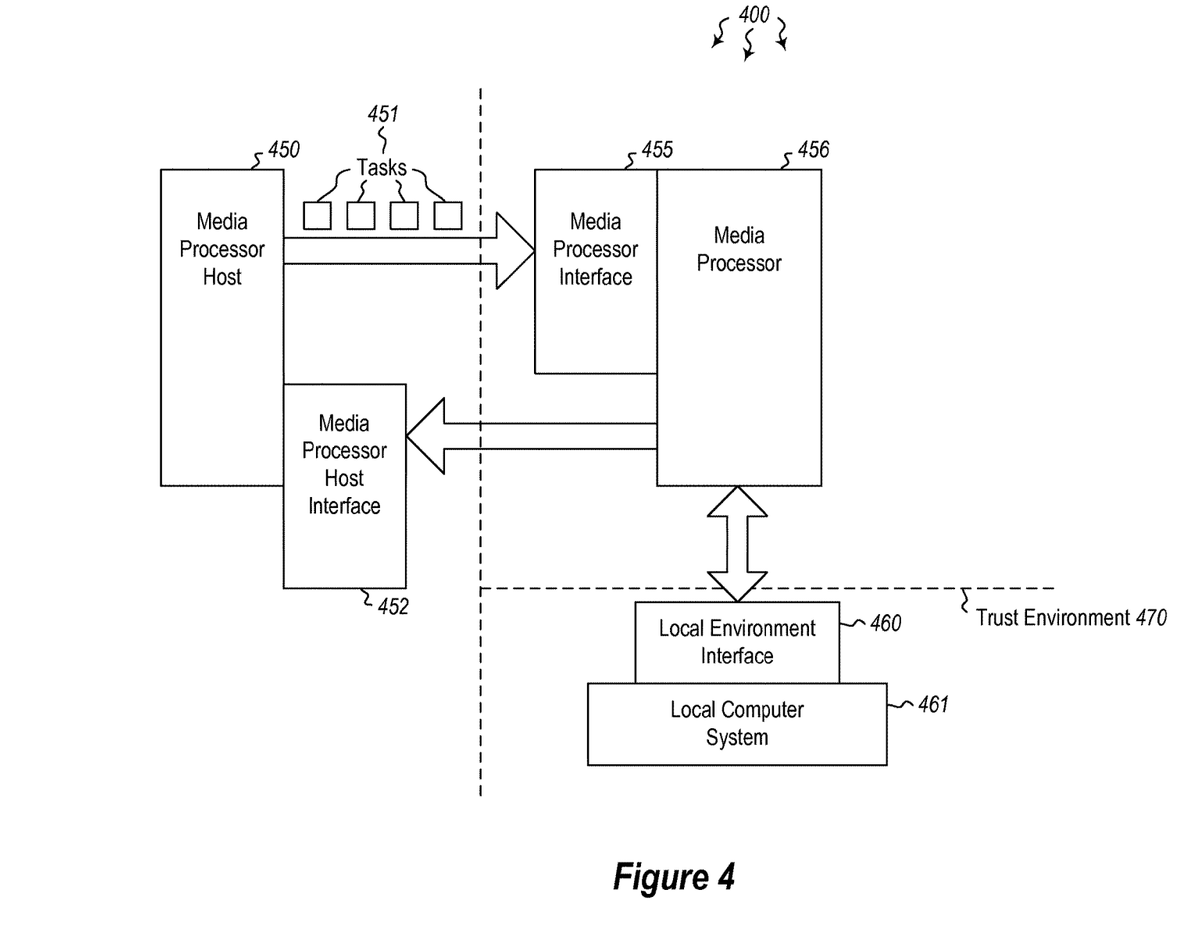
FIG. 4 illustrates a computing environment in which a media processor interacts with a local computer system and a media processor host.

As shown in FIG. 4, the media processor 456 may be sandboxed such that the media processor has limited access to computer system resources. The trust environment 470 indicates trust boundaries. Accordingly, the media processor runs untrusted by the media processor host (e.g. computer system 101) and/or by the local computer system that is actually running the virtual machine that is running the media processor (if that computer system is different than computer system 101—it will be appreciated that virtual machines may be moved between physical computing systems, and thus may be initiated on one computer system and then be moved to another). As such, in order for the media processor to perform local tasks (such as storing data on a local hard drive, or using local hardware to perform encryption, etc.), the media processor requests access through either the media processor host interface 452 (for media processor host 450) or through local environment interface 460 (for local computer system 461).

Thus, in one example, the media processor 456 may receive tasks 451 from media processor host 450 through media processor interface 455. The sandboxed media processor may attempt to access computer system resources using the host interface 452. Once access is granted (using proper authentication, for example), the media processor may have limited access to the media processor's local resources.

Upon completion of a task, the media processor may send the results to the communication module 110 for transmit or direct presentation to the user. In cases where the output serves as an input to another workflow, the output will be chained to that workflow. In cases where the output is in user-readable form, the output may be displayed to a user in a graphical or other user interface.

FIG. 3 illustrates a flowchart of a method 300 for providing a management portal that allows users to manage their media processors. The method 300 will now be described with frequent reference to the components and data of environment 100.

Method 300 includes an act of receiving an input from a user indicating that at least one virtual machine running a first version of a user-specified media processor is to be is to be updated to a second, different version of the user-specified media processor, the virtual machine including an installed media processor that processes workflow tasks (act 310). Each virtual machine may run substantially any number of media processors. Thus, as shown in FIG. 1, virtual machine 120A has one media processor 121, while virtual machine 120B has two media processors (122A and 122B). Of course, more than one or two media processors may installed and/or running on each virtual machine.

In some cases, a user may wish to upgrade a media processor that they produce. Thus, for instance, user 105B may desire to upgrade media processor 122A of virtual machine 120B. An interface may be provided by computer system 101 which shows the user each of their media processors and which version each processor is running. The user may create the updated media processor (e.g. updates 109) and an installation script, and then move them to the media processor for installation. In some cases, an administrator or other user or group of users may be designated to review the code for any received updated installation files. The administrator may thus receive the updated binary files for the media processor. These binaries include installation files that will update the version of the media processor from an older version to a newer version. The administrator or other user may verify the integrity of the received binary files and then send an indication to the user indicating that the binary files of the newer version of the (user-specified) media processor have been verified and approved for use by any virtual machines hosted by the computer system 101.

Method 300 further includes an act of transferring those workflow tasks that are pending processing by the installed user-specified media processor on the virtual machine to a second, different virtual machine (act 320). Thus, any workflow tasks 107 that are still pending in the workflow queue 116 are transferred to another virtual machine (e.g. 120B) while the new media processor is installed. As such, the workflow tasks 107 can continue being processed while the new media processor is installed. In other cases, the workflow tasks may be suspended while new media processors are being installed. After the tasks are suspended (or transferred to another virtual machine), the user-specified media processor's installation files are updated on the virtual machine (act 330). The computer system 101 may be configured to flush any remaining memory artifacts from the virtual machine prior to installing the second version of the user-specified media processor to ensure a clean installation. The second (updated) version of the user-specified media processor is then installed on the virtual machine using the updated installation files (act 340).

In some cases, these installation files are executed immediately after they have been updated. In other cases, the installation files remain un-activated until triggered by an incoming task 107 or other indication that they are to be initiated. The user may thus monitor and update any of the media processors that they produce or manage. A graphical user interface may be provided which shows the user's media processors and which version each is running. The user interface may also be configured to show various metrics regarding the usage of the media processor including: hourly/daily/weekly usage statistics, usage patterns, crash dumps, execution errors and other events that have occurred for that media processor. From this interface, the user may also be able to change settings, alter or customize workflows or perform other tasks related to the management of the user's media processors.

Accordingly, methods, systems and computer program products are provided which provide an extensible platform that allows users to select from and implement different types of media processors. These media processors may be publicly available media processors, or may be privately owned media processors. Still further, methods, systems and computer program products are provided which provide a management portal that allows users to manage and customize their media processors.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system, comprising the following:
one or more processors;
system memory; and
one or more computer-readable storage media having stored thereon computer-executable instructions that are structured such that, when executed by the one or more processors, the computer-executable instructions cause the computing system to deploy a media processor on a virtual machine to process a media file, including at least the following:
  receiving, from a source remote system, a workflow that includes a workflow task that includes the identity of at least:
    the media processor, which includes functionality for processing the media file;
    an option specific to the media processor for configuring the media processor; and
    the media file, which is to be processed by the media processor on behalf of the source remote system;
  instantiating the virtual machine on hardware resources of a virtual machine host;
  instructing the virtual machine to execute an installation file for the media processor, resulting in the virtual machine installing the media processor on the virtual machine;
  instructing the installed media processor on the virtual machine to perform the processing of the identified media file using the identified option for configuring the media processor;
  receiving an indication that the media processor is to be updated to a different version of the media processor; and
  based at least upon receiving a request to process a subsequent workflow task that is dependent on the different version of the media processor, automatically performing at least the following:
    transferring a pending workflow task at the virtual machine to another media processor executing on another virtual machine;

updating the installation file of the media processor on the virtual machine with an updated installation file containing the different version of the media processor; and installing the different version of the media processor on the virtual machine using the updated installation file.

2. The computer system of claim 1, also including adding the one or more tasks to a task queue, the task queue comprising tasks from a plurality of users.

3. The computer system of claim 1, wherein the workflow is defined by a user.

4. The computer system of claim 1, wherein the media processor is provided as part of the workflow.

5. The computer system of claim 1, wherein the media processor is sandboxed, such that the media processor has limited access to virtual machine host resources.

6. The computer system of claim 5, wherein the sandboxed media processor is configured to access the virtual machine host resources using a host interface.

7. The computer system of claim 6, wherein the accessed virtual machine host resources comprise at least one of the following: local computer system data storage, data encryption and data decryption.

8. The computer system of claim 1, also including chaining one or more results to one or more subsequent workflow tasks.

9. The computer system of claim 1, wherein the media processor includes one or more of the following modules: a video encoder module, a video transcoder module, an image processor module, an audio encoder module, or an audio transcoder module.

10. The computer system of claim 1, also including receiving the updated installation file and an installation script that, upon execution by the virtual machine, installs the different version of the media processor on the virtual machine.

11. The computer system of claim 10, also including presenting a user interface for the media processor, the user interface showing one or more of the following metrics regarding the media processor: usage statistics, usage patterns, crash dumps, or execution errors that have occurred.

12. The computer system of claim 1, also including:
receiving a binary file of the different version of the media processor for approval by the virtual machine host;
verifying the integrity of the received binary file; and
determining that the binary file of the different version of the media processor has been verified and approved for use by virtual machines hosted by the virtual machine host.

13. The computer system of claim 1, also including flushing remaining memory artifacts from the virtual machine prior to installing the different version of the media processor.

14. The computer system of claim 1, wherein the media processor includes one or more of the following modules: a digital watermarking module, or a digital rights management module.

15. The computer system of claim 1, also including:
receiving, from the virtual machine, a processed media file resulting from the installed media processor having performed the processing of the media file; and
transmitting the processed media file back to the source remote system.

16. A method, implemented at a computer system that includes one or more processors, for deploying a media processor on a virtual machine to processes a media file, the method comprising:
receiving from a source remote system, a workflow that includes a workflow task that includes the identity of at least:
the media processor, which includes functionality for processing the media file;
an option specific to the media processor for configuring the media processor; and
the media file, which is to be processed by the media processor on behalf of the source remote system;
instantiating the virtual machine on hardware resources of a virtual machine host;
instructing the virtual machine to execute an installation file for the media processor, resulting in the virtual machine installing the media processor on the virtual machine;
instructing the installed media processor on the virtual machine to perform the processing of the identified media file using the identified option for configuring the media processor;
receiving an indication that the media processor is to be updated to a different version of the media processor; and
based at least upon receiving a request to process a subsequent workflow task that is dependent on the different version of the media processor, automatically performing at least the following:
transferring a pending workflow task at the virtual machine to another media processor executing on another virtual machine;
updating the installation file of the media processor on the virtual machine with an updated installation file containing the different version of the media processor; and
installing the different version of the media processor on the virtual machine using the updated installation file.

17. The method of claim 16, further comprising chaining one or more results to one or more subsequent workflow tasks.

18. The method of claim 16, wherein the media processor includes one or more of the following modules: a video encoder module, a video transcoder module, an image processor module, an audio encoder module, or an audio transcoder module.

19. The method of claim 16, further comprising:
receiving, from the virtual machine, a processed media file resulting from the installed media processor having performed the processing of the media file; and
transmitting the processed media file back to the source remote system.

20. One or more hardware storage devices having stored thereon computer-executable instructions that are structured such that, when executed by one or more processors, the computer-executable instructions cause a computing system to deploy a media processor on a virtual machine to process a media file, including at least the following:
receiving from a source remote system, a workflow that includes a workflow task that includes the identity of at least:
the media processor, which includes functionality for processing the media file;
an option specific to the media processor for configuring the media processor; and the media file, which is to be processed by the media processor on behalf of the source remote system;

instantiating the virtual machine on hardware resources of a virtual machine host;

instructing the virtual machine to execute an installation file for the media processor, resulting in the virtual machine installing the media processor on the virtual machine;

instructing the installed particular media processor on the virtual machine to perform the requested processing of the identified media file using the identified option for configuring the media processor;

receiving an indication that the media processor is to be updated to a different version of the media processor; and based at least upon receiving a request to process a subsequent workflow task that is dependent on the different version of the media processor, automatically performing at least the following:

transferring a pending workflow task at the virtual machine to another media processor executing on another virtual machine;

updating the installation file of the media processor on the virtual machine with an updated installation file containing the different version of the media processor; and     installing the different version of the media processor on the virtual machine using the updated installation file.

\* \* \* \* \*